US012493919B2

(12) United States Patent
Lingala et al.

(10) Patent No.: US 12,493,919 B2
(45) Date of Patent: Dec. 9, 2025

(54) MAINTAINING HEALTHY ROOMS FOR USERS USING MOBILE CREDENTIALS

(71) Applicant: HONEYWELL INTERNATIONAL INC., Charlotte, NC (US)

(72) Inventors: Ramesh Lingala, Miyapur (IN); Aswin Sukumaran Nair, Telangana (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 189 days.

(21) Appl. No.: 18/323,532

(22) Filed: May 25, 2023

(65) Prior Publication Data
US 2023/0385973 A1 Nov. 30, 2023

Related U.S. Application Data

(60) Provisional application No. 63/345,651, filed on May 25, 2022.

(51) Int. Cl.
*G06Q 10/10* (2023.01)
*G06Q 40/08* (2012.01)
*G06Q 50/26* (2024.01)

(52) U.S. Cl.
CPC .................. *G06Q 50/265* (2013.01)

(58) Field of Classification Search
CPC .......... G06Q 50/265; G05B 2219/2642; G05B 15/02
USPC .................. 705/1.1–912
See application file for complete search history.

(56) References Cited

U.S. PATENT DOCUMENTS

| 10,599,116 | B2 | 3/2020 | Pillai et al. |
| 10,861,120 | B1* | 12/2020 | Weir .................. G08B 21/0266 |
| 11,170,593 | B1* | 11/2021 | Schneider .............. H04N 7/186 |
| 11,240,056 | B2 | 2/2022 | Zribi et al. |
| 12,073,058 | B1* | 8/2024 | Vesterman .......... G06F 3/04817 |
| 2011/0109434 | A1* | 5/2011 | Hadsall, Sr. ....... G08B 21/0275 340/8.1 |

(Continued)

FOREIGN PATENT DOCUMENTS

| CN | 105116848 B | 4/2018 |
| JP | 5416066 B2 * | 2/2014 |

(Continued)

OTHER PUBLICATIONS

JP5416066b2, Sep. 14, 2010, Foreign Reference Machine Translation (Year: 2010).*

(Continued)

*Primary Examiner* — Jonathan P Ouellette
(74) *Attorney, Agent, or Firm* — Seager, Tufte & Wickhem, LLP (57) ABSTRACT

A system for environmental monitoring and user health is provided. The system includes a multi-sensor deployed in a local space of a building to sense multiple characteristics of the local space and a building management system receptive of signals from the multi-sensor, the signals being indicative of the multiple characteristics sensed by the multi-sensor. The building management system is configured to determine whether the local space is exhibiting an unhealthy condition based on the signals and to prevent user access, which would be otherwise authorized, to the local space exhibiting the unhealthy condition while the unhealthy condition persists.

17 Claims, 5 Drawing Sheets

(56) References Cited

U.S. PATENT DOCUMENTS

| | | | |
|---|---|---|---|
| 2012/0280812 A1* | 11/2012 | Sheikman | G01S 13/876 |
| | | | 340/539.13 |
| 2014/0076969 A1* | 3/2014 | Marshall Chesney | G07C 9/23 |
| | | | 235/382 |
| 2014/0176302 A1* | 6/2014 | Kukoyi | G07C 9/00904 |
| | | | 340/5.61 |
| 2014/0188287 A1 | 7/2014 | Sabata | |
| 2015/0220867 A1 | 8/2015 | Christensen | |
| 2018/0139569 A1* | 5/2018 | Padgett | H04W 4/029 |
| 2019/0209806 A1 | 7/2019 | Allen et al. | |
| 2019/0333119 A1 | 10/2019 | Sweny | |
| 2020/0224915 A1 | 7/2020 | Nourbakhsh et al. | |
| 2020/0286350 A1 | 9/2020 | Heintzelman et al. | |
| 2020/0378641 A1 | 12/2020 | Uriarte et al. | |
| 2021/0018884 A1 | 1/2021 | Kupa et al. | |
| 2021/0257085 A1 | 8/2021 | Arumugam et al. | |
| 2021/0350490 A1* | 11/2021 | Frey | G16H 40/67 |
| 2021/0350642 A1* | 11/2021 | Schneider | G07C 9/00571 |
| 2021/0393834 A1* | 12/2021 | Wellig | F24F 11/63 |
| 2023/0335272 A1* | 10/2023 | Douglas | G05B 19/042 |

FOREIGN PATENT DOCUMENTS

| | | |
|---|---|---|
| KR | 20190096264 A | 8/2019 |
| KR | 102308033 B1 | 10/2021 |
| WO | 202199637 A1 | 5/2021 |
| WO | 2021168279 A1 | 8/2021 |

OTHER PUBLICATIONS

Barsocchi, P.; Ferro, E.; La Rosa, D.; Mahroo, A.; Spoladore, D., "E-Cabin: A Software Architecture for Passenger Comfort and Cruise Ship Management.", Sensors 2019, Nov. 15, 2019, 4978. https://doi.org/10.3390/s19224978, (Year: 2019).*

Nolich M, Spoladore D, Carciotti S, Buqi R, Sacco M., "Cabin as a Home: A Novel Comfort Optimization Framework for IoT Equipped Smart Environments and Applications on Cruise Ships", Sensors (Basel). Mar. 2, 2019 2; 19(5):1060. doi: 10.3390/s19051060. (Year: 2019).*

Search Report issued in European Patent Application No. 23174974. 8; Application Filing Date May 23, 2023; Date of Mailing Oct. 11, 2023 (8 pages).

Airthings, "Airthings 2930 Wave Plus—Radon & Air Quality Monitor (CO2, VOC, Humidity, Temp, Pressure)" Amazon <URL: https://www.amazon.com/Airthings-2930-Quality-Detection-Dashboard/dp/B07JB8QWH6> accessed: Mar. 21, 2022 (4 pages).

Barsocchi et al. "E-Cabin: a software architecture for passenger comfort and cruise ship management" Sensors 19.22 (Nov. 2019): 4978 (17 pages).

* cited by examiner

MAINTAINING HEALTHY ROOMS FOR USERS USING MOBILE CREDENTIALS

CROSS-REFERENCE TO RELATED APPLICATIONS

This application claims the benefit of U.S. Provisional Application No. 63/345,651 filed May 25, 2022, the disclosure of which is incorporated herein by reference in its entirety.

BACKGROUND

The following description relates to maintaining healthy rooms for using mobile credentials and, more specifically, methods and systems for controlling access to spaces using a system to maintain healthy rooms for users using mobile credentials.

It is becoming increasing important to monitor air quality in closed spaces. This is particularly important in cases in which large numbers of people occupy a same closed space for a significant period of time, such as with cruise ships for example. Cruise ships are essentially large hotels at see in which thousands of people, customers, staff and officers live on a boat together for days at a time and often share the same spaces inside the boat. Each individual is typically given a key card, which provides the individual access to various parts of the boat. In the case of a customer, his key card might give him access to his stateroom and the common areas of the boat. For an officer, his key card might give him access to his stateroom, the common areas of the boat and the bridge or engine areas.

In any case, it is very important for each individual on board a cruise ship to remain healthy during a cruise. This can be difficult, however, given the prevalence of viruses and other pathogens as well as other types of dangers on board. These other types of dangers can be identified by certain physical characteristics, such as high humidity and/or temperature levels, loud noises, etc.

BRIEF DESCRIPTION

According to an aspect of the disclosure, a system for environmental monitoring and user health is provided. The system includes a multi-sensor deployed in a local space of a building to sense multiple characteristics of the local space and a building management system receptive of signals from the multi-sensor, the signals being indicative of the multiple characteristics sensed by the multi-sensor. The building management system is configured to determine whether the local space is exhibiting an unhealthy condition based on the signals and to prevent user access, which would be otherwise authorized, to the local space exhibiting the unhealthy condition while the unhealthy condition persists.

In accordance with additional or alternative embodiments, the building includes a cruise ship and the local space includes a stateroom or a portion of a stateroom of a user.

In accordance with additional or alternative embodiments, the multiple characteristics of the local space sensed by the multi-sensor include at least humidity, temperature and noise levels of the local space.

In accordance with additional or alternative embodiments, the multi-sensor is communicative with the building management system via wired or wireless communications and the building management system includes a central server, a gateway communicatively interposed between the central server and one or more of the multi-sensors and a cloud network communicatively interposed between the gateway and the central server.

In accordance with additional or alternative embodiments, the building management system prevents user access to the local space by disabling a key card of a user from unlocking a door lock of the local space.

In accordance with additional or alternative embodiments, the building management system is further configured to notify the user as to the unhealthy condition and a status of user access.

In accordance with additional or alternative embodiments, the building management system is further configured to at least one of control fire/water doors, direct users to lifeboats and track user locations.

According to an aspect of the disclosure, a system for environmental monitoring and user health is provided. The system includes multi-sensors, each of which is deployed in local spaces of a building to sense multiple characteristics of each local space, and a building management system receptive of signals from each of the multi-sensors, the signals being indicative of the multiple characteristics sensed by each of the multi-sensors. The building management system is configured to determine whether one or more local spaces are exhibiting an unhealthy condition based on the signals and to prevent user access, which would be otherwise authorized, to the one or more local spaces exhibiting the unhealthy condition while the unhealthy condition persists.

In accordance with additional or alternative embodiments, the building includes a cruise ship and one or more of the local spaces includes a stateroom or a portion of a stateroom of a user.

In accordance with additional or alternative embodiments, the multiple characteristics of the local spaces sensed by each of the multi-sensors includes at least humidity, temperature and noise levels of the local spaces.

In accordance with additional or alternative embodiments, each of the multi-sensors is communicative with the building management system via wired or wireless communications and the building management system includes a central server, a gateway communicatively interposed between the central server and one or more of the multi-sensors and a cloud network communicatively interposed between the gateway and the central server.

In accordance with additional or alternative embodiments, the building management system prevents user access to the one or more local spaces exhibiting the unhealthy condition by disabling a key card of a user from unlocking door locks of the one or more local spaces.

In accordance with additional or alternative embodiments, the building management system is further configured to notify the user as to the unhealthy condition and a status of user access.

In accordance with additional or alternative embodiments, the building management system is further configured to at least one of control fire/water doors, direct users to lifeboats and track user locations.

According to an aspect of the disclosure, a method for environmental monitoring and user health is provided. The method includes deploying multi-sensors to sense multiple characteristics of each local space of a building, generating signals indicative of the multiple characteristics sensed by each of the multi-sensors, receiving the signals at a building management system, determining, at the building management system, whether one or more local spaces are exhibiting an unhealthy condition based on the signals and preventing, by the building management system, user access that would be otherwise authorized to the one or more local spaces exhibiting the unhealthy condition while the unhealthy condition persists.

In accordance with additional or alternative embodiments, the building includes a cruise ship and one or more of the local spaces includes a stateroom or a portion of a stateroom of a user and the multiple characteristics of the local spaces sensed by each of the multi-sensors includes at least humidity, temperature and noise levels of the local spaces.

In accordance with additional or alternative embodiments, each of the multi-sensors is communicative with the building management system via wired or wireless communications and the building management system includes a central server, a gateway communicatively interposed between the central server and one or more of the multi-sensors and a cloud network communicatively interposed between the gateway and the central server.

In accordance with additional or alternative embodiments, the preventing of user access to the one or more local spaces exhibiting the unhealthy condition includes disabling a key card of a user from unlocking door locks of the one or more local spaces.

In accordance with additional or alternative embodiments, the method further includes notifying, by the building management system, the user as to the unhealthy condition and a status of user access.

In accordance with additional or alternative embodiments, wherein the method further includes at least one of controlling, by the building management system, fire/water doors, directing, by the building management system, users to lifeboats and tracking, by the building management system, user locations.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Multi-sensor detectors are deployed throughout a cruise ship and monitor the spaces on board. The multi-sensor detectors communicate with a central server through a gateway to report their readings. If a user tries to enter an unhealthy space (for example, a space in which a local multi-sensor detector detects humidity levels, temperatures, noise, etc., that are indicative of an unhealthy condition) and is permitted to do so, this could impact his health especially in cases in which the user in unaware of the unhealthy condition of the space.

Thus, as will be described below, systems and methods are provided in which the multi-sensor detectors are deployed throughout a cruise ship to monitor the spaces on board and communicate their findings to a central server. As such, a determination can be made as to whether a given space is characterized as having an unhealthy condition and, in an event a user attempts to access the space, a further determination can be made as to whether to prevent access even if the user's credentials would otherwise grant such access.

That is, in an exemplary case, once a user's stateroom on a cruise ship is found to have an unhealthy condition by the local multi-sensor detector(s) (i.e., the stateroom elevated humidity, elevated temperature, loud noises, etc.), a centralized system, such as Autronica Autroguard™, will decide to engage door locks on the doors to that stateroom. This can be done over wireless technology, with an alert sent to the user's mobile phone. Subsequently, once the user comes toward the stateroom, the engaged door locks will prevent the user from accessing an interior of the stateroom at least until the unhealthy condition subsides regardless of the user's credentials. This centralized system can also identify healthy spaces for the user, control fire doors/watertight doors to close to control the spreading of fire/water during an emergency and can assist directing users toward lifeboats in an emergency.

Figure 1:
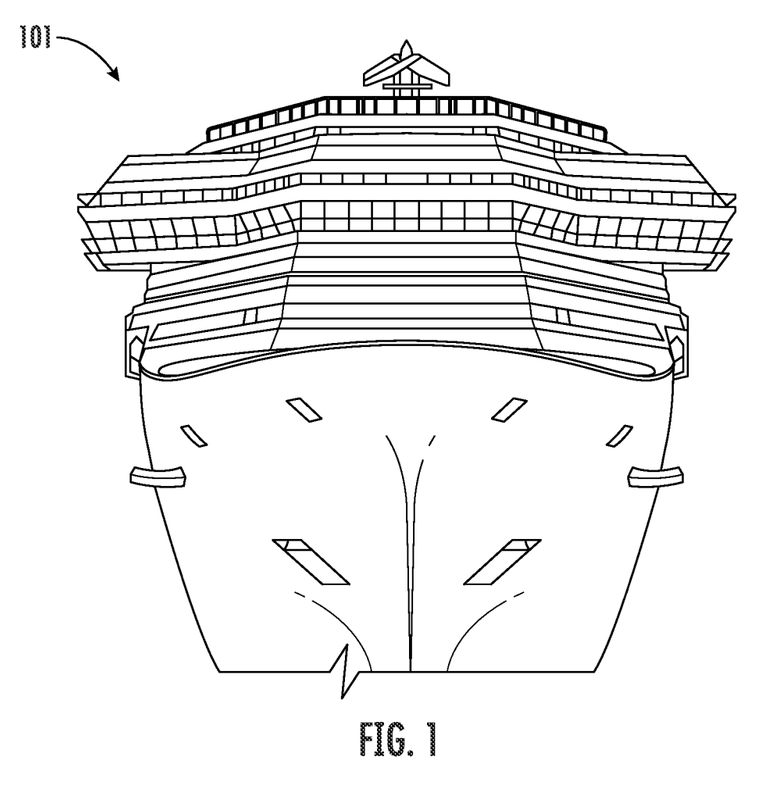
FIG. 1 is a front view of a cruise ship in accordance with exemplary embodiments.
Figure 2:
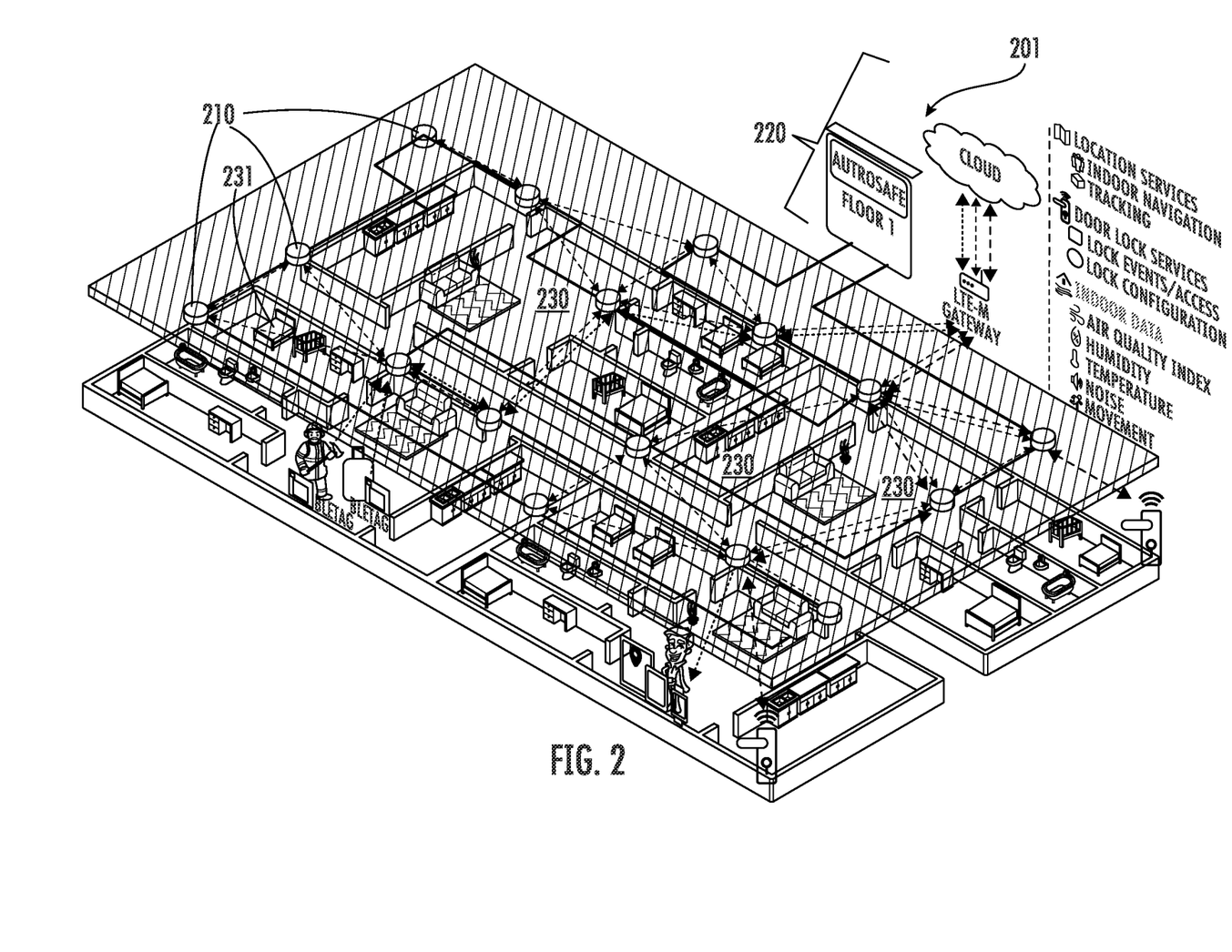
FIG. 2 is a perspective schematic illustration of a system for environmental monitoring and user health in accordance with exemplary embodiments.

With reference to FIGS. 1 and 2, a system 201 for environmental monitoring and user health is provided for use in a building, such as a cruise ship 101 as shown in FIG. 1. As shown in FIG. 2, the system 201 includes multi-sensors 210 and a building management system 220.

Each of the multi-sensors 210 is respectively deployed in local spaces 230 of the building (hereinafter referred to as the cruise ship 101). Each of the multi-sensors 210 is configured to sense multiple characteristics of each local space 230. In accordance with embodiments, the multiple characteristics of the local spaces 230 sensed by each of the multi-sensors 210 includes at least humidity, temperature and noise levels of the local spaces 230 and, in some cases, can include humidity, temperature and noise levels as well as air quality, ventilation, lighting and views, water quality, safety and security and dusts and pets. In the particular case in which the building is the cruise ship 101, one or more of the local spaces 230 can include a stateroom 231 or a portion of a stateroom (i.e., a living room, a bedroom or a bathroom of a stateroom) of a user.

The building management system 220 is receptive of signals from each of the multi-sensors 210, where the signals are indicative of the multiple characteristics sensed by each of the multi-sensors 210. The building management system 220 is configured to determine whether one or more local spaces 230 are exhibiting an unhealthy condition based on the signals. The building management system 220 is also configured to prevent user access, which would be otherwise authorized, to the one or more local spaces 230 exhibiting the unhealthy condition while the unhealthy condition persists.

Figure 3:
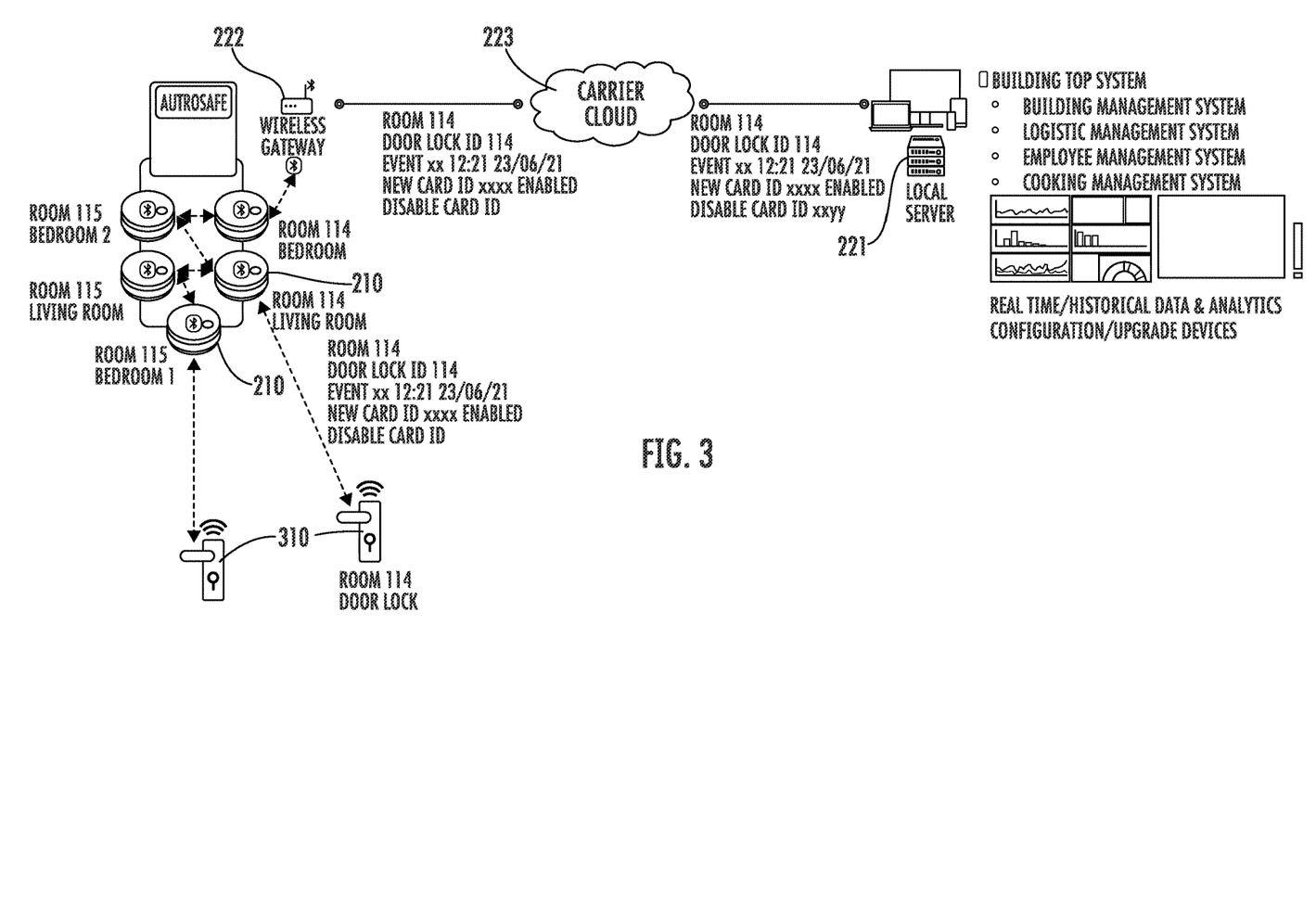
FIG. 3 is a flow diagram illustrating communications between multi-sensors and a building management system in accordance with exemplary embodiments.
Figure 4:
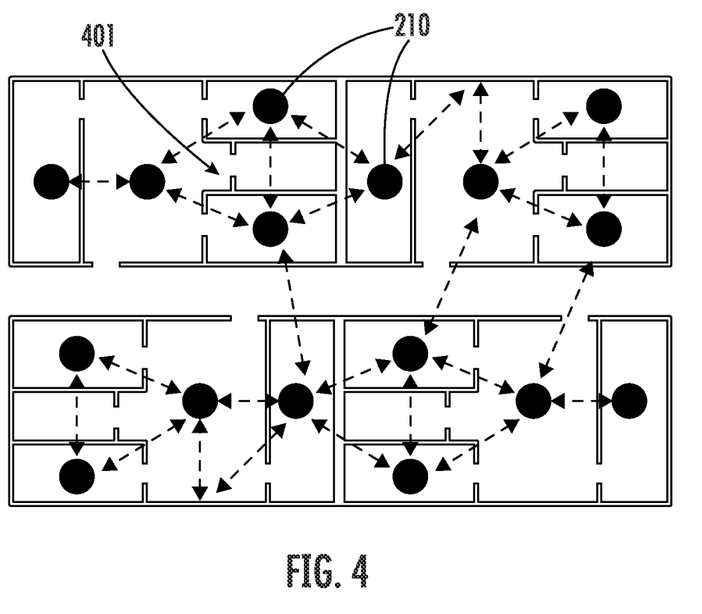
FIG. 4 is a plan view illustrating a web of multi-sensors in accordance with exemplary embodiments.

With reference to FIGS. 3 and 4, each of the multi-sensors 210 can be communicative with the building management system 220 via wired or wireless communications (see FIG. 3) and/or with each other (see FIG. 4) to form a network or web 401 of multi-sensors 210. In any case, the building management system 220 can include a central server 221, one or more gateways 222 communicatively interposed between the central server 221 and one or more of the multi-sensors 210 and a cloud network 223 communicatively interposed between the one or more gateways 222 and the central server 221.

The building management system 220 offers multiple functionalities. These include, but are not limited to, a capability to prevent user access to the one or more local spaces 210 exhibiting the unhealthy condition by disabling a key card of a user from unlocking door locks 310 (see FIG. 3) of the one or more local spaces 210. The functionalities further include a capability to notify the user as to the unhealthy condition and a status of user access as well as at least one of a capability to control fire/water doors, a capability to direct users to lifeboats and a capability to track user locations.

Figure 5:
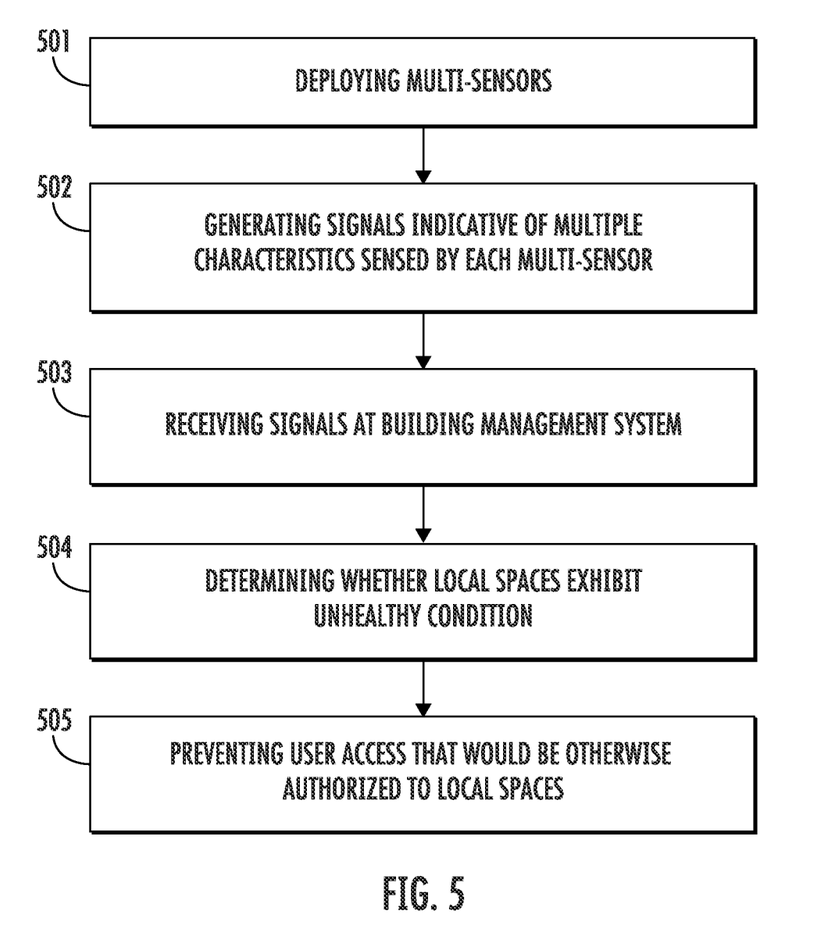
FIG. 5 is a flow diagram illustrating a method for environmental monitoring and user health in accordance with exemplary embodiments.

With reference to FIG. 5, a method for environmental monitoring and user health is provided. As shown in FIG. 5, the method can be executed by the systems and features described herein and includes deploying multi-sensors to sense multiple characteristics of each local space of a building (block 501), generating signals indicative of the multiple characteristics sensed by each of the multi-sensors (block 502), receiving the signals at a building management system (block 503), determining, at the building management system, whether one or more local spaces are exhibiting an unhealthy condition based on the signals (block 504) and preventing, by the building management system, user access that would be otherwise authorized to the one or more local spaces exhibiting the unhealthy condition while the unhealthy condition persists (block 505).

As above, the building can include a cruise ship and one or more of the local spaces can include a stateroom or a portion of a stateroom of a user. In these or other cases, the multiple characteristics of the local spaces sensed by each of the multi-sensors can include at least humidity, temperature and noise levels of the local spaces and, in some cases, can include humidity, temperature and noise levels as well as air quality, ventilation, lighting and views, water quality, safety and security and dusts and pets. Also as above, each of the multi-sensors is communicative with the building management system via wired or wireless communications and the building management system includes a central server, a gateway communicatively interposed between the central server and one or more of the multi-sensors and a cloud network communicatively interposed between the gateway and the central server.

In accordance with embodiments, the preventing of user access to the one or more local spaces exhibiting the unhealthy condition of block 505 can include disabling a key card of a user from unlocking door locks of the one or more local spaces. In addition, the method can further include notifying, by the building management system, the user as to the unhealthy condition and a status of user access and at least one of controlling, by the building management system, fire/water doors, directing, by the building management system, users to lifeboats and tracking, by the building management system, user locations.

In another embodiment, when users come near to room door locks (i.e., for an unhealthy room), the system will send a signal to lock to hold/block user entry by enabling/disabling a dead-bolt (or privacy lock). This condition can be maintained until the unhealthy condition of the room returns to normal.

In another embodiment, the system described herein can be leveraged for hotel spaces in hospitality businesses. For example, where hotel rooms have electronic door locks, the system can monitor hotel room conditions to ascertain a health status (i.e., by monitoring air quality, humidity, temperature, etc.) and then convey that health status to the user. Such communications can be done via mobile phones and be based on guest mobile credentialing system.

Technical effects and benefits of the present disclosure are the enablement of a system to maintain a good environment and can help with faster evacuation processes.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system for environmental monitoring and user health, the system comprising:
   a multi-sensor deployed in a local space of a building to sense multiple characteristics of the local space; and
   a building management system receptive of signals from the multi-sensor, the signals being indicative of the multiple characteristics sensed by the multi-sensor,
   the building management system being configured to:
      determine whether the local space is exhibiting an unhealthy condition based on the signals; and
      prevent user access, which would be otherwise authorized by credentials associated with a key card of a user, to the local space exhibiting the unhealthy condition while the unhealthy condition persists by disabling the key card of the user from unlocking a door lock of the local space while the unhealthy condition persists,
   wherein the building comprises a cruise ship and the local space comprises a stateroom or a portion of a stateroom of the user; and
   wherein the building management system is further configured to control fire/water doors of the cruise ship, direct users to lifeboats and track user locations on the cruise ship.

2. The system according to claim 1, wherein the multiple characteristics of the local space sensed by the multi-sensor comprise at least humidity, temperature and noise levels of the local space.

3. The system according to claim 1, wherein the multi-sensor is communicative with the building management system via wired or wireless communications and the building management system comprises:
   a central server;
   a gateway communicatively interposed between the central server and one or more of the multi-sensor; and
   a cloud network communicatively interposed between the gateway and the central server.

4. The system according to claim 1, wherein the building management system is further configured to notify the user as to the unhealthy condition and a status of user access.

5. The system of claim 1, wherein the building management system prevents user access by engaging a dead-bolt lock that remains engaged until the unhealthy condition returns to normal.

6. The system of claim 1, wherein the building management system communicates health status information to users via a mobile credentialing system specific to cruise ship operations.

7. A system for environmental monitoring and user health, the system comprising:
    multi-sensors, each of which is deployed in local spaces of a building to sense multiple characteristics of each local space; and
    a building management system receptive of signals from each of the multi-sensors, the signals being indicative of the multiple characteristics sensed by each of the multi-sensors,
    the building management system being configured to determine whether one or more local spaces are exhibiting an unhealthy condition based on the signals and to prevent user access, which would be otherwise authorized by credentials associated with a key card of a user, to the one or more local spaces exhibiting the unhealthy condition while the unhealthy condition persists by disabling the key card of the user from unlocking a door lock of the local space while the unhealthy condition persists,
    wherein the building comprises a cruise ship and one or more of the local spaces comprises a stateroom or a portion of a stateroom of the user; and
    wherein the building management system is further configured to control fire/water doors on the cruise ship, direct users to lifeboats and track user locations on the cruise ship.

8. The system according to claim 7, wherein the multiple characteristics of the local spaces sensed by each of the multi-sensors comprise at least humidity, temperature and noise levels of the local spaces.

9. The system according to claim 8, wherein each of the multi-sensors is communicative with the building management system via wired or wireless communications and the building management system comprises:
    a central server;
    a gateway communicatively interposed between the central server and one or more of the multi-sensors; and
    a cloud network communicatively interposed between the gateway and the central server.

10. The system according to claim 7, wherein the building management system is further configured to notify the user as to the unhealthy condition and a status of user access.

11. The system of claim 7, wherein the building management system prevents user access by engaging a dead-bolt lock that remains engaged until the unhealthy condition returns to normal.

12. A method for environmental monitoring and user health, the method comprising:
    deploying multi-sensors to sense multiple characteristics of each local space of a building;
    generating signals indicative of the multiple characteristics sensed by each of the multi-sensors;
    receiving the signals at a building management system;
    determining, at the building management system, whether one or more local spaces are exhibiting an unhealthy condition based on the signals; and
    preventing, by the building management system, user access that would be otherwise authorized by credentials associated with a key card of a user to the one or more local spaces exhibiting the unhealthy condition while the unhealthy condition persists by disabling the key card of the user from unlocking a door lock of the local space while the unhealthy condition persists;
    wherein the building comprises a cruise ship and one or more of the local spaces comprises a stateroom or a portion a stateroom or the user; and
    the method further comprising:
        controlling, by the building management system, fire/water doors of the cruise ship;
        directing, by the building management system, users to lifeboats; and
        tracking, by the building management system, user locations on the cruise ship.

13. The method according to claim 12, wherein:
    the multiple characteristics of the local spaces sensed by each of the multi-sensors comprise at least humidity, temperature and noise levels of the local spaces.

14. The method according to claim 12, wherein each of the multi-sensors is communicative with the building management system via wired or wireless communications and the building management system comprises:
    a central server;
    a gateway communicatively interposed between the central server and one or more of the multi-sensors; and
    a cloud network communicatively interposed between the gateway and the central server.

15. The method according to claim 12, further comprising notifying, by the building management system, the user as to the unhealthy condition and a status of user access.

16. The method of claim 12, further comprising preventing, via the building management system, user access by engaging a dead-bolt lock that remains engaged until the unhealthy condition returns to normal.

17. The method of claim 12, further comprising communicating, via the building management system, health status information to users via a mobile credentialing system specific to cruise ship operations.

* * * * *